INVENTOR.
WILLIAM WALLACE ROWE.
BY
Allen & Allen
ATTORNEYS.

Patented Apr. 23, 1940

2,198,392

UNITED STATES PATENT OFFICE 2,198,392

CREPED PRODUCTS, INCLUDING TRANSLUCENT FILMS

William Wallace Rowe, Cincinnati, Ohio, assignor to The Paper Service Company, Lockland, Ohio, a corporation of Ohio Application August 5, 1935, Serial No. 34,686

6 Claims. (Cl. 154—55)

My invention relates in general to the manufacture of creped products which consist in or include creped films of translucent material, such as various cellulosic films, some of the newer films, such as "Pliofilm," and the like. In such products I secure novel and highly useful characteristics, including, but without limitation new decorative effects and new isolative effects, together with special surface effects arising out of properties of particular films, especially where these are used as a surface layer.

The general objects of my invention will be set forth hereinafter or will be clear to one skilled in the art upon reading these specifications. Reference is made to the drawing, wherein—

Figure 1:
Figure 1 is a sectional representation of a piece of creped, translucent film.

I have found that relatively thin films of transparent or translucent character, such as Celluloid, Cellophane, films of cellulose acetate or nitrate, "Pliofilm," "Protectoid," or the like, may be creped as such, if desired, through the use of a positive adhesive body. They respond very well, for example, to the process set forth in my reissue patent No. Re. 17,633, and also may be given multi-lateral stretchability in accordance with the teachings of a patent in the name of William C. Kemp, entitled The art of producing multi-lateral stretchability in paper webs or the like, No. 2,008,181, issued July 16, 1935. The creping adhesives include, but without limitation, latex, bitumen, resins, and vegetable or other adhesives.

The general advantages of the use of a creped film of this character may be summarized more or less as follows: Where staining by materials, such as adhesive used in other laminae of the product, is to be feared, the impervious film will prevent this. The film being proof in itself, depending, of course, upon its nature, against penetration of moisture, greases or oils, gases, odors and the like, and not being disrupted in its structure by the creping operation, imparts these characteristics to composite webs of which it forms a part, so that reliance does not have to be had upon particular types of adhesives. A film of this character has no lint or fibers to pick up dust or dirt, nor to cause the contents of a bag, for example, made of such a product, to cling thereto. Moreover, such surfaces are more easily cleaned, and may be made to have not only an appearance of greater sanitation, but actually greater sanitation. Such film surfaces have greater resistance to abrasion than paper. Such films are frequently decorative in and of themselves can be colored or not, as desired, are translucent or transparent, so that printing or decoration, or the like, may be displayed through them. Consequently, they lend themselves very well to the production of decorative effects; and products made in accordance with my invention may be used as wall coverings, or wrappings, or bags, or other coverings for articles.

One novel characteristic imparted to such films by a creping operation is the characteristic of expansibility. Some such films have a limited degree of inherent stretchability, and some of them deteriorate or change their nature upon stretching; but a creped film of this character can be given substantially as much expansibility as desired in the creping operation, and then can be elongated to the extent of this expansibility without disruption or deterioration. Especially where the films have been given universal stretchability, as by being creped in accordance with the teachings of the Kemp application referred to hereinabove, they may very readily be caused to conform to uneven surfaces. Moreover, the universal expansibility permits the butting of the edges of adjacent films much more easily when such films are fixed to a surface.

Some such films have characteristics of softening under heat, and therefore this property may be taken advantage of in the heat sealing of the materials.

I have indicated in Figure 1 a film 1 in creped condition, bearing upon one face a coating 2 of the creping adhesive. I have also indicated an intermediate coating 3, which is optional, but which, where employed, may be a coating of coloring matter, lacquer, or other substance, or a printing or a decoration, or a bronzing, or the like. The translucent nature of the film allows such decoration to have its appropriate effect upon the visual appearance of the article, while the nature of the film itself imparts a desired surface appearance. Moreover, when such films are creped, the creping itself gives to them a certain texture or sheen, which is controllable variably not only by the choice of different creping processes, but also by variations of the fineness or coarseness of the creping produced therein, in ways which are within the skill of the worker in the creped paper art.

Creped films, such as that illustrated in Figure 1, may be independently made and then joined, if desired, to backing substances. Such composite webs are of advantage in that the backing substance adds body to the material and in many instances strength. Moreover, in the case of a transparent film joined by means of a transparent adhesive to another web, the surface of the other web, decorated or not, as desired, may be visible through the film and form a part of the total decorative effect.

For most uses, however, it is advantageous to have a backing web or webs also creped or stretchable; and where this is desired, it is convenient to form a laminated product first, and then conjointly crepe all of the laminae. This procedure also permits the use of very delicate and thin films, inasmuch as at the time of creping they are backed by heavier materials, and therefore offer less difficulty in handling. In the manufacture of duplex or multi-plex webs for creping, I prefer to follow a process and use a machine set forth in a companion application in my name, entitled Processes and machines for making composite creped products, filed August 5, 1935, Ser. No. 34,689.

Figure 2:
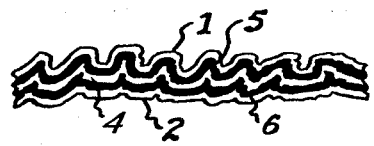
Fig. 2 is a sectional representation of a duplex product, including a layer of film substance.

I have illustrated in Fig. 2 a composite product comprising the film 1 joined by means of the adhesive 5 to a web of paper 4. Again there may be placed between the adhesive and the film, any decorative layer or the adhesive itself may be colored. The paper layer 4 is shown as bearing upon its other surface a coating of the creping adhesive 2. Such products are durable, tough and easily handled, and serve excellently for decorative uses in general. If the surface of the paper layer 4, for example, were decorated or otherwise to be relied upon as contributing to the decorative effect of the article, in so far as it is apparent through the translucent or transparent film, the adhesive used to join the paper and the film will, of course, be transparent or translucent; but in addition there may be a problem of preventing a staining of the paper layer by the creping adhesive, where the creping adhesive is of staining character, as, for example, where an asphalt is used. If the creping adhesive 5 is an asphalt, for example, it may be well to treat the paper 4, prior to the application of the staining adhesive, with a stain preventing substance such, for example, as a layer of rubber latex indicated in Fig. 2 at 6. This may be applied in accordance with the teachings of my companion application hereinabove referred to. Other stain preventing media may, of course, be used, or the paper itself may be impregnated with a stain preventing substance, or an impervious film may be cemented between the decoration and the staining creping adhesive.

Figure 3:
Fig. 3 is a sectional view of a composite reinforced product, also embodying my invention.

I have shown in Fig. 3 a composite, reinforced product comprising the article of Fig. 1, joined by means of the creping adhesive, or by other adhesive, to a reinforcing web, such as a web of burlap 7. Other reinforcing structures may likewise be used, including, but without limitation, fibers or strands of thread crossing or not, as desired; and the reinforcement may, if desired, be interleaved between layers of paper and/or between the paper and the film. In this way very strong products may be made, suitable not only for wall coverings and coverings or articles in general, but also for the manufacture of bags, and other containers wherein especial advantage may be taken of the proofness imparted to the product by the films which form a part thereof, and to their surface characteristics, and their attractive, fresh and sanitary appearance. For example, it will be competent in manufacturing a bag for foodstuffs to use a white film or a transparent or translucent film in connection with an adhesive which is a white substance, so that the state of cleanliness of the article is readily apparent, and its sanitation actually increased.

Highly attractive products may be made by joining a transparent or translucent film to paper or other backing by means of a black adhesive, such as asphalt, and creping the whole. In this connection it is frequently advantageous to apply the asphalt in liquid form to the backing and then cool it before applying the transparent film, particularly where the film is one which is likely to be injured by heating. The cement may be one which remains tacky at ordinary temperatures or it may have its tackiness developed to a sufficient extent for the purpose by careful temperature control without reaching a temperature so high as to injure the film.

Similarly when creping the film alone by means of a thermoplastic adhesive, it may be found advantageous to apply the adhesive as a layer to the creping surface, controlling its temperature as desired, and then applying the transparent or translucent film to the pre-formed layer of adhesive.

In the case of hygroscopic films of which untreated Cellophane is an example, it is sometimes found that there is a tendency for the film when wet to lose its adhesiveness to asphalt or similar adhesives. Control of the condition of the film is possible during manufacture and the deleterious effects of subsequent moisture absorption can be overcome, I have found, by covering the surface of the creped Cellophane with a coating of paint or lacquer, transparent or otherwise, which keeps the moisture away from the film and prevents loss of adhesion between it and the adhesive substance.

In the claims which follow, the term "film" is defined as referring to the preformed films of commerce, of the nature of cellulose acetates, nitrates, and esters, "Cellophane," Celluloid, "Pliofilm," "Protectoid", and the like, which are manufactured and handled as such, and which are to be distinguished from coatings of initially liquid or plastic form, which may be imposed in such form on base materials.

Modifications may be made in my invention without departing from the spirit thereof.

In the claims which follow where I refer to a creped condition of a web or to the process of creping I mean either the condition produced by or the process of forming rugosities in the web by causing it to adhere to a creping surface and removing it from said surface by means of a creping doctor.

Having thus described my invention, what I claim as new and desire to secure by Letters Patent, is:

1. A composite product, comprising a non-fibrous film having a substantial expansibility arising from creping crinkles therein, said film being united to a backing web by a substantially continuous layer of adhesive substance interposed therebetween.

2. A product as claimed in claim 1 in which the film has the quality of universal stretchability arising from crossing sets of creping crinkles.

3. A product as claimed in claim 1, in which said backing web is a web of paper, and in which said film and said web are in conjointly creped condition.

4. A product as claimed in claim 1 in which said backing web is a layer of cloth.

5. A product as claimed in claim 1, in which between said film and said adhesive there is a decorative coating visible through said film.

6. A product as claimed in claim 1, in which said film on its exposed surface bears a coating of lacquer.

WILLIAM WALLACE ROWE.